(12) United States Patent
Fu et al.

(10) Patent No.: US 11,513,193 B2
(45) Date of Patent: Nov. 29, 2022

(54) MULTI-LINE LASER RADAR

(71) Applicant: HUAWEI TECHNOLOGIES CO., LTD., Shenzhen (CN)

(72) Inventors: Liding Fu, Beijing (CN); Guangyuan Shi, Shenzhen (CN); Song Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 353 days.

(21) Appl. No.: 16/915,816

(22) Filed: Jun. 29, 2020

(65) Prior Publication Data
US 2020/0333444 A1 Oct. 22, 2020

Related U.S. Application Data

(63) Continuation of application No. PCT/CN2018/125305, filed on Dec. 29, 2018.

(30) Foreign Application Priority Data

Dec. 29, 2017 (CN) .......................... 201711469783.8

(51) Int. Cl.
*G01S 7/481* (2006.01)
*G02B 26/12* (2006.01)

(52) U.S. Cl.
CPC .......... *G01S 7/4815* (2013.01); *G01S 7/4817* (2013.01); *G02B 26/123* (2013.01)

(58) Field of Classification Search
CPC .... G01S 7/4815; G01S 7/4817; G01S 7/4818; G01S 17/42; G01S 17/931; G02B 26/123; G02B 26/105
See application file for complete search history.

(56) References Cited

U.S. PATENT DOCUMENTS 8,773,644 B2 7/2014 Suzuki et al.
8,836,922 B1 9/2014 Pennecot et al.
(Continued)

FOREIGN PATENT DOCUMENTS

CN  101356450 A  1/2009
CN  103576209 A  2/2014
(Continued)

OTHER PUBLICATIONS

Shi et al., "High pulse repetition frequency fiber-coupled laser-diodemodule," Optical Engineering, vol. 55, No. 12, pp. 1-5, Society of Photo-Optical Instrumentation Engineers, Bellingham, Washington (Dec. 2016).

*Primary Examiner* — Jared Walker
(74) *Attorney, Agent, or Firm* — Leydig, Voit & Mayer, Ltd.

(57) ABSTRACT

A multi-line laser radar includes a first radar component, where the first radar component includes n lasers, an optical collimating unit, a scanning rotating mirror, and a detector, where n is greater than 1. Each laser is configured to emit one laser beam to the optical collimating unit. The optical collimating unit is configured to collimate n laser beams, where the collimated n laser beams are incident on a target reflector of the scanning rotating mirror. The scanning rotating mirror includes m reflectors rotating around a rotation axis, where a rotation plane of the rotation axis is perpendicular to an arrangement direction of the collimated n laser beams, and m is greater than 1. The target reflector reflects the received collimated n laser beams to a detection area of the first radar component. The detector receives echo signals of the reflected n laser beams in the detection area.

20 Claims, 4 Drawing Sheets

(56) References Cited

U.S. PATENT DOCUMENTS

| | | | |
|---|---|---|---|
| 9,086,273 B1 | 7/2015 | Gruver et al. | |
| 2003/0234923 A1 | 12/2003 | Hipp | |
| 2008/0100691 A1* | 5/2008 | Sobue | B41J 2/471 |
| | | | 347/247 |
| 2014/0009747 A1 | 1/2014 | Suzuki et al. | |
| 2014/0375898 A1* | 12/2014 | Kurozuka | G02B 26/101 |
| | | | 359/213.1 |
| 2016/0018638 A1* | 1/2016 | Kawano | G03G 15/04072 |
| | | | 29/428 |
| 2016/0274223 A1 | 9/2016 | Imai | |

FOREIGN PATENT DOCUMENTS

| | | |
|---|---|---|
| CN | 103675831 A | 3/2014 |
| CN | 104898125 A | 9/2015 |
| CN | 105785343 A | 7/2016 |
| CN | 106371085 A | 2/2017 |
| CN | 108061904 A | 5/2018 |
| EP | 2687865 A1 | 1/2014 |

\* cited by examiner

MULTI-LINE LASER RADAR

CROSS-REFERENCE TO RELATED APPLICATIONS

This application is a continuation of International Application No. PCT/CN2018/125305, filed on Dec. 29, 2018, which claims priority to Chinese Patent Application No. 201711469783.8, filed on Dec. 29, 2017. The disclosures of the aforementioned applications are hereby incorporated by reference in their entireties.

TECHNICAL FIELD

Embodiments of this application relate to the field of laser detection technologies, and in particular, to a multi-line laser radar.

BACKGROUND

A laser radar is a radar system that is capable of detecting characteristics such as a location and a speed of a target by emitting a laser beam. The laser radar may be classified into a panoramic laser radar and a forward-looking laser radar based on a detection range. A detection range of the panoramic laser radar is 360 degrees, and a detection range of the forward-looking laser radar is 90 degrees to 110 degrees straight ahead. Redundant information in information detected by the forward-looking laser radar is less than that of the panoramic laser radar, and therefore the forward-looking laser radar is more in line with a development trend of the intelligent transportation field.

Currently, the forward-looking laser radar usually adopts a "single transmit and multiple receive" structure. To be specific, one laser emits a laser beam, and a plurality of detectors receive echo signals of the laser beam. The following uses a typical four-line laser radar as an example to describe the "single transmit and multiple receive" structure. The four-line laser radar uses two "single transmit and multiple receive" structures. FIG. 1 is a schematic structural diagram of a four-line laser radar. The four-line laser radar includes two lasers, one four-channel detector array, and one scanning rotating mirror, where the two lasers include a first laser 111 and a second laser 112; the four-channel detector array includes a first detector 121, a second detector 122, a third detector 123, and a fourth detector 124; and the scanning rotating mirror is a double-sided parallel prism 13. The first laser 111 and the second laser 112 are arranged in parallel in a vertical direction, and are configured to emit the laser beam. The double-sided parallel prism 13 is configured to reflect the laser beam emitted by the first laser 111 and the second laser 112. The first detector 121 and the second detector 122 are configured to receive echo signals of the laser beam emitted by the first laser 111, and the third detector 123 and the fourth detector 124 are configured to receive echo signals of the laser beam emitted by the second laser 112, so as to implement four-line scanning.

Because a quantity of detectors of the laser radar is relatively large, the detectors need to work under a high frequency and a high voltage. Limited by a volume of the laser radar, a distance between the detectors is limited, so that a signal crosstalk between the detectors is relatively serious, thereby causing unstable working performance of the laser radar.

SUMMARY

Embodiments of this application provide a multi-line laser radar, so as to resolve a problem of unstable working performance of a multi-line laser radar provided by a related technology.

According to an aspect, an embodiment of this application provides a multi-line laser radar, where the multi-line laser radar includes a first radar component. The first radar component includes n lasers, an optical collimating unit, a scanning rotating mirror, and a detector, where n is an integer greater than 1. Each laser of the n lasers is configured to emit one laser beam to the optical collimating unit. The optical collimating unit is configured to collimate n laser beams, and the collimated n laser beams are incident on a target reflector of the scanning rotating mirror, where the scanning rotating mirror includes a rotation axis and m reflectors rotating around the rotation axis, a rotation plane of the rotation axis is perpendicular to an arrangement direction of the collimated n laser beams, the target reflector is a reflector that is in the m reflectors and that is currently rotated to a position opposite to an emergent direction of the collimated n laser beams, and m is an integer greater than 1. The target reflector is configured to reflect the received collimated n laser beams, where the reflected n laser beams are incident on a detection area of the first radar component, and at least two reflectors existing in the m reflectors have different reflection angles for a same laser beam. The detector is configured to receive echo signals of the reflected n laser beams in the detection area.

According to the technical solutions in this embodiment of this application, the multi-line laser radar includes the first radar component that uses a "multiple transmit and single receive" structure, where only one detector is disposed in the first radar component, and a quantity of detectors is reduced as much as possible on a premise of implementing multi-line scanning, so as to reduce a signal crosstalk between detectors. Therefore, working performance of the multi-line laser radar can be improved, and hardware costs required for the multi-line laser radar can be reduced. In addition, the scanning rotating mirror includes the at least two reflectors that have different reflection angles for a same laser beam. Therefore, one laser can implement at least two-line scanning, and the quantity of scanning lines of the multi-line laser radar can be increased without increasing a quantity of lasers.

In a possible design, different reflectors in the m reflectors have different reflection angles for a same laser beam.

According to the technical solutions in this design, all the reflectors have different reflection angles for a same laser beam. Therefore, one laser can implement m-line scanning, and a quantity of scanning lines of the multi-line laser radar can be increased without increasing a quantity of lasers.

In a possible design, an included angle between a normal line of a plane on which an $i^{th}$ reflector of the m reflectors is located and a straight line on which the rotation axis is located is $\alpha+(i-1)\gamma$, where $0°<\alpha\leq90°$, $\gamma=(n-1)\varepsilon_1$, $\varepsilon_1$ is a vertical angular resolution of the first radar component, and i is a positive integer less than or equal to m.

According to the technical solutions in this design, included angles between normal lines of planes on which the reflectors are located and the straight line on which the rotation axis is located are in arithmetic progression, and included angles between laser beams subsequently reflected by the scanning rotating mirror are also in arithmetic progression. In other words, when the multi-line laser radar performs multi-line scanning, the laser beams are arranged more evenly.

In a possible design, the first radar component further includes: n optical fibers. The n lasers are in a one-to-one correspondence with the n optical fibers. The optical fiber is configured to export the laser beam emitted by the laser to the optical collimating unit.

According to the technical solutions in this design, the laser beam is exported to the optical collimating unit by using the optical fiber, and the optical fibers are densely arranged to implement dense arrangement of laser beams. In addition, because a volume of the optical fiber is small, using the optical fiber to export the laser beam to the optical collimating unit can make a layout of components in the multi-line laser radar more flexible and convenient, so as to help improve positioning precision between an optical source and the optical collimating unit, and further effectively shape an irregular laser beam emitted by the laser into a flat top laser beam with a circular profile. Compared with the irregular laser beam, the flat top laser beam with the circular profile has more uniform and centralized energy distribution, so as to help improve a detection distance of the multi-line laser radar.

In a possible design, a light outlet point of the optical fiber is located on a focal plane of the optical collimating unit.

According to the technical solutions in this design, the light outlet point of the optical fiber is disposed on the focal plane of the optical collimating unit, so as to help better obtain a collimated beam.

In a possible design, a fiber core spacing d between two adjacent optical fibers in the n optical fibers is:

$d = f \times \tan(\varepsilon_1)$, where f is a focal length of the optical collimating unit, and $\varepsilon_1$ is the vertical angular resolution of the first radar component.

According to the technical solutions in this design, the fiber core spacing between two adjacent optical fibers is set such that an included angle formed when the laser beams are emitted through the optical collimating unit is relatively small and the detector can completely receive echo signals of the laser beams, which helps improve accuracy of target detection.

In a possible design, a receiving field of view $\varphi$ of the detector is:

$\varphi = \sigma[(n-1) + \varepsilon_1 \delta]$, where $\sigma$ is a preset tolerance factor, $\varepsilon_1$ is the vertical angular resolution of the first radar component, and $\delta$ is a divergence angle of the laser beam.

According to the technical solutions in this design, the receiving field of view of the detector is set properly such that the detector can receive the echo signal of the laser beam at a maximum degree, which further improves accuracy of target detection.

In a possible design, if the quantity of scanning lines of the first radar component is k, a vertical field of view $\theta$ of the multi-line laser radar is:

$\theta = (k-1)\varepsilon_1 + \delta$, where $\varepsilon_1$ is the vertical angular resolution of the first radar component, and $\delta$ is the divergence angle of the laser beam.

In a possible design, all the lasers work in a time-division mode.

According to the technical solutions in this design, all the lasers work in a time-division mode such that a case in which the detector falsely considers an echo signal of a laser beam as an echo signal of another laser beam can be avoided, so as to avoid signal misjudgment.

In a possible design, an arrangement direction of the collimated n laser beams is a vertical direction.

According to the technical solutions in this design, the arrangement direction of the laser beams is set to the vertical direction such that the multi-line laser radar can detect an obstacle in a forward-facing direction, and can be applied to the intelligent transportation field.

DESCRIPTION OF EMBODIMENTS

To make objectives, technical solutions, and advantages of this application clearer, the following describes the technical solutions in the embodiments of this application with reference to accompanying drawings.

According to the technical solutions in the embodiments of this application, a multi-line laser radar includes a first radar component that uses a "multiple transmit and single receive" structure, where only one detector is disposed in the first radar component, and a quantity of detectors is reduced as much as possible on a premise of implementing multi-line scanning, so as to reduce a signal crosstalk between detectors. Therefore, working performance of the multi-line laser radar can be improved, and hardware costs required for the multi-line laser radar can be reduced. In addition, a scanning rotating mirror includes at least two reflectors that have different reflection angles for a same laser beam. Therefore, one laser can implement at least two-line scanning, and a quantity of scanning lines of the multi-line laser radar can be increased without increasing a quantity of lasers.

Figure 1:
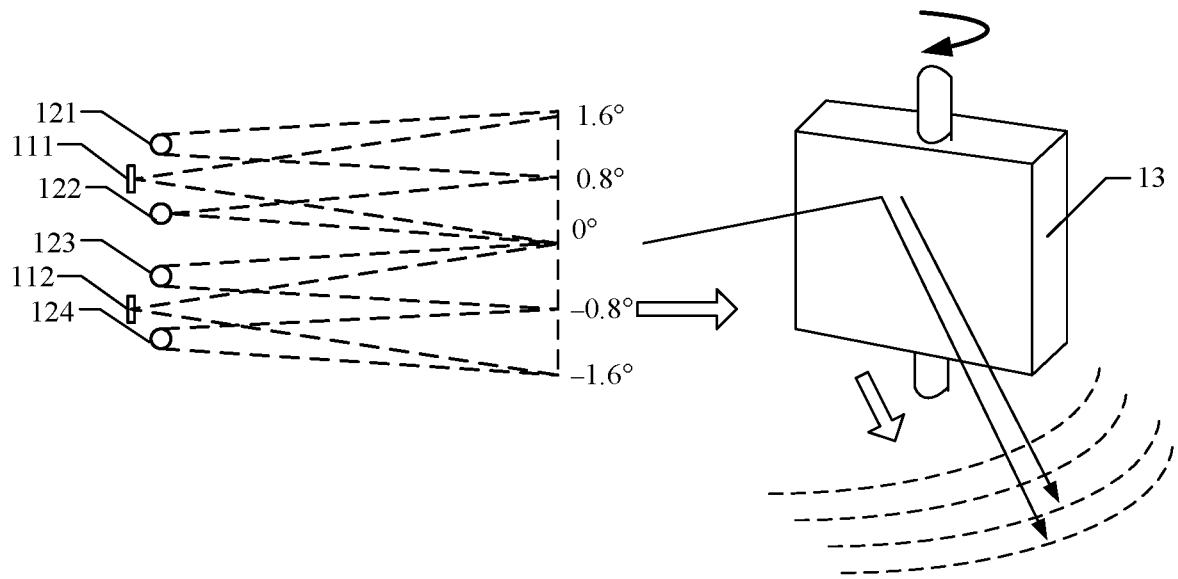
FIG. 1 is a schematic diagram of a multi-line laser radar according to the prior art.
Figure 2:
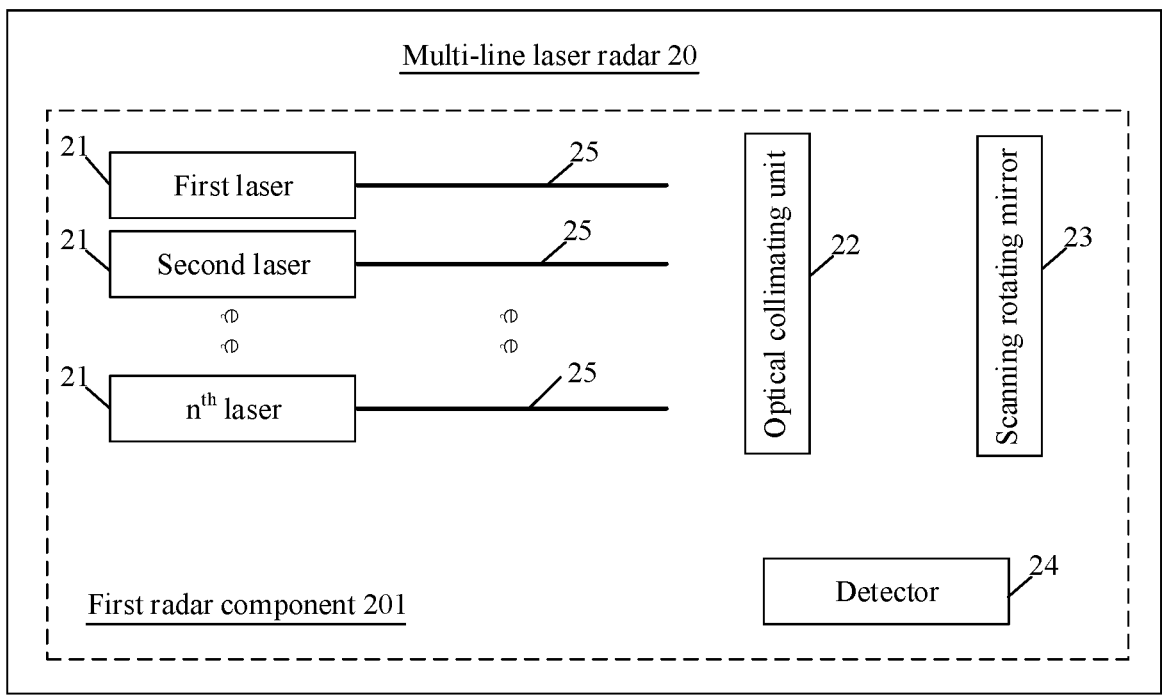
FIG. 2 is a schematic diagram of a multi-line laser radar according to an example embodiment of this application.

FIG. 2 is a schematic diagram of a multi-line laser radar 20 according to an embodiment of this application.

The multi-line laser radar 20 includes a first radar component 201. The multi-line laser radar 20 may include at least one first radar component 201. In this embodiment, description is given only by using an example that the multi-line laser radar 20 includes one first radar component 201. The following embodiment describes and explains a structure of the first radar component 201.

In addition to the first radar component 201, the multi-line laser radar may further include a second radar component.

The second radar component may be a laser radar that uses a "single transmit and multiple receive" structure, or may be a laser radar that uses a "single transmit and single receive" structure, or may be a laser radar that uses another structure. This is not limited in this embodiment of this application. The laser radar that uses the "single transmit and single receive" structure refers to a laser radar with same quantities of lasers and detectors.

The first radar component 201 may include: n lasers 21, an optical collimating unit 22, a scanning rotating mirror 23, and one detector 24, where n is an integer greater than 1.

Each laser 21 of the n lasers 21 is configured to emit one laser beam to the optical collimating unit 22. Optionally, the laser 21 is a semiconductor laser. Optionally, a frequency at which a single laser 21 emits a laser beam is less than or equal to 50 KHz (kilohertz). For example, when the frequency at which the single laser 21 emits a laser beam is 50 KHz, the single laser 21 emits a laser beam once every 20 μs (microseconds).

Optionally, all the lasers 21 work in a time-division mode. The time-division mode means that times at which all the lasers 21 emit laser beams do not overlap with each other. When times at which the lasers 21 emit laser beams are different, times at which the detector 24 receives echo signals of the laser beams are also different. The detector 24 can determine, based on a time at which the detector 24 receives an echo signal of a laser beam, a laser 21 that emits the laser beam, thereby avoiding signal misjudgment that may occur when all the lasers 21 work at the same time.

Optionally, the first radar component 201 further includes n optical fibers 25. The n lasers 21 are in a one-to-one correspondence with the n optical fibers 25. The optical fiber 25 is configured to export the laser beam emitted by the laser 21 to the optical collimating unit 22. The first radar component 201 requires that laser beams emitted by the laser 21 are densely arranged when the first radar component 201 works, and an arrangement spacing should not exceed 0.5 mm (millimeter). However, each laser 21 is separately packaged, and has a relatively large volume, and consequently dense arrangement cannot be implemented. Therefore, in this embodiment of this application, an optical fiber coupling technology is used to couple the laser beam into the optical fiber 25, and the optical fibers 25 are densely arranged, so as to implement dense arrangement of the laser beams. In addition, the optical fiber coupling technology makes a layout of components of the first radar component 201 more flexible and convenient, so as to help improve positioning precision between an optical source and the optical collimating unit 22, and further effectively shape an irregular laser beam emitted by the laser 21 into a flat top laser beam with a circular profile. Compared with the irregular laser beam, the flat top laser beam with the circular profile has more uniform and centralized energy distribution, so as to help improve a detection distance of the first radar component 201.

Optionally, a light outlet point of the optical fiber 25 is located on a focal plane of the optical collimating unit 22. The focal plane of the optical collimating unit 22 is a plane that includes a focal point of the optical collimating unit 22 and that is perpendicular to a main optical axis of a system. The light outlet point of the optical fiber 25 is disposed on the focal plane of the optical collimating unit 22, so as to help better obtain a collimated beam.

Optionally, a fiber core spacing d between two adjacent optical fibers 25 in the n optical fibers 25 is:

$d = f \times \tan(\varepsilon_1)$, where f is a focal length of the optical collimating unit 22. To be specific, the focal length is a distance from the focal point of the optical collimating unit 22 to a plane on which the optical collimating unit 22 is located. In addition, to make a divergence angle δ of the laser beam less than a preset angle, the focal length f of the optical collimating unit 22 should meet the following formula:

$$\tan(\delta) = \frac{\beta}{f},$$

where

β is a core diameter of the optical fiber 25. For example, β is 200 μm (micron), and the divergence angle δ of the laser beam is 0.6°. In this case, the focal length f of the optical collimating unit 22 is 20 mm (millimeter).

$\varepsilon_1$ is a vertical angular resolution of the first radar component 201, that is, an angle corresponding to a minimum distance that can be resolved by the first radar component 201 in a vertical direction. In an example in which the multi-line laser radar 20 is applied to the field of intelligent transportation technologies, a minimum distance between two adjacent vehicles is not less than 100 meters, and a body height of a small car ranges from 1.4 meters to 1.6 meters. To detect a small car 100 meters away, the vertical angular resolution of the first radar component 201 is $\varepsilon_1 = \tan^{-1}(1.4/100) = 0.8°$. Therefore, to meet a detection requirement in the field of intelligent transportation technologies, the vertical angular resolution E of the first radar component 201 should be less than 0.8°. A value of the vertical angular resolution of the first radar component 201 depends on related parameters and location relationships of the optical fiber 25, the optical collimating unit 22, and the scanning rotating mirror 23. In other words, the related parameters and the location relationships of the optical fiber 25, the optical collimating unit 22, and the scanning rotating mirror 23 may be properly set, to enable the vertical angular resolution $\varepsilon_1$ of the first radar component 201 to be less than 0.8°.

The focal length f of the optical collimating unit 22 is 20 mm, and the vertical angular resolution $\varepsilon_1$ of the first radar component 201 is 0.8°, which are substituted into the formula that the fiber core spacing d between two adjacent optical fibers 25 should meet, so as to obtain the value of d, which is 0.28 mm. The fiber core spacing d is properly set, so that an included angle at which a laser beam is emitted through the optical collimating unit 22 is relatively small, and therefore the detector 24 can completely receive an echo signal of the laser beam. In this way, detection accuracy can be improved.

The optical collimating unit 22 is configured to collimate the n laser beams, where the collimated n laser beams are incident on a target reflector of the scanning rotating mirror 23. Collimating the laser beams is to change divergent light in the laser beams into parallel light. Optionally, the optical collimating unit 22 is a collimating lens.

The scanning rotating mirror 23 includes a rotation axis and m reflectors rotating around the rotation axis, where m is an integer greater than 1. The rotation axis rotates based on a preset rotation period, so that the laser beam emitted by the laser 21 can be successively incident on the reflectors. A rotation plane of the rotation axis is perpendicular to an arrangement direction of the collimated n laser beams. The rotation plane of the rotation axis is a plane on which each mass point in the rotation axis performs a circular movement. The arrangement direction of the collimated n laser beams reflects an arrangement relationship of the n laser beams. The arrangement direction of the collimated n laser beams may be a vertical direction, or may be a horizontal direction. In the foregoing manner, the laser beam can be accurately incident on the reflectors rotating around the rotation axis. Optionally, the arrangement direction of the laser beams is the vertical direction, so that the first radar component 201 can detect an obstacle in front, and can be applied to the intelligent transportation field.

The target reflector is a reflector that is in the m reflectors and that is currently rotated to a position opposite to an emergent direction of the collimated n laser beams. In this embodiment, in a rotation period of the rotation axis, the reflector opposite to the emergent direction of the collimated n laser beams switches from one to another successively in the m reflectors. Therefore, the target reflector may be any one of the m reflectors. The target reflector is configured to reflect the received collimated n laser beams, and the reflected n laser beams are incident on a detection area of the first radar component 201. The detection area of the first radar component 201 is determined based on a direction of reflecting the collimated n laser beams by the target reflector.

At least two reflectors existing in the m reflectors have different reflection angles for a same laser beam. A reflection angle is an included angle between a laser beam and a normal line of a plane on which the reflector is located. A same laser beam may be reflected at different reflection angles, to obtain a plurality of laser beams, and the plurality of laser beams are staggered from each other at a specific angle, so that multi-line scanning can be implemented without increasing a quantity of lasers 21 used to emit laser beams. In an example in which the multi-line laser radar 20 includes two lasers 21, the scanning rotating mirror 23 includes two reflectors rotating around the rotation axis, and the two reflectors have different reflection angles for a same laser beam, the first radar component 201 can implement four-line scanning.

Optionally, different reflectors in the m reflectors have different reflection angles for a same laser beam. In the foregoing manner, a quantity of scanning lines of the first radar component 201 can be increased.

Optionally, an included angle between a normal line of a plane on which an $i^{th}$ reflector of the m reflectors is located and a straight line on which the rotation axis is located is $\alpha+(i-1)\gamma$, where $0°<\alpha\leq 90°$, $\gamma=(n-1)\varepsilon_1$, $\varepsilon_1$ is a vertical angular resolution of the multi-line laser radar 20, and i is a positive integer less than or equal to m. $\alpha$ is a minimum included angle between a normal line of a plane on which a reflector is located and the straight line on which the rotation axis is located. In this embodiment, a difference of included angles between normal lines of planes on which any two adjacent reflectors are located and the straight line on which the rotation axis is located is $\gamma$. In the foregoing manner, when the first radar component 201 performs the multi-line scanning, the laser beams can be arranged more evenly.

The detector 24 is configured to receive echo signals of the reflected n laser beams in the detection area. When an obstacle exists in the detection area of the first radar component 201, the obstacle reflects the reflected n laser beams again to generate the echo signals, and the detector 24 receives the echo signals. In this embodiment, the detector 24 can receive echo signals of a plurality of laser beams with different reflection angles. To enable the detector 24 to receive the echo signals at a maximum degree, a receiving field of view of the detector 24 is:

$\varphi=\sigma[(n-1)\varepsilon_1+\delta]$, where $\sigma$ is a preset tolerance factor. In an actual application, because factors such as an optical lens aberration, a mechanical processing error, and atmospheric disturbance all affect a laser beam, a divergence angle of the laser beam is greater than an ideal value. Therefore, a specific margin needs to be reserved when the receiving field of view of the detector 24 is set. In addition, when the receiving field of view of the detector 24 is relatively large, external optical noise is relatively large, and consequently a signal-to-noise ratio of an echo signal of the laser beam decreases. Therefore, the receiving field of view of the detector 24 cannot be set to be excessively large. According to the foregoing factors, a value of $\sigma$ ranges from 1 to 2. For example, $\sigma$ is 1.5. $\varepsilon_1$ is the vertical angular resolution of the multi-line laser radar 20. $\delta$ is the divergence angle of the laser beam, and is used to determine a speed at which the laser beam diverges outward from a waist. When the divergence angle $\delta$ of the laser beam is smaller, the speed at which the laser beam diverges outward from the waist is slower, and energy of the laser beam is more centralized. When the divergence angle of the laser beam $\delta$ is larger, the energy of the laser beam is more dispersed. In order to increase a detection distance of the first radar component 201, the divergence angle $\delta$ of the laser beam should be as small as possible, and should not exceed the vertical angular resolution $\varepsilon_1$ of the first radar component 201. For example, the divergence angle $\delta$ of the laser beam is 0.6°.

In addition, the first radar component 201 further includes parameters such as a vertical field of view $\theta$ and a horizontal angular resolution $\varepsilon_2$.

The vertical field of view refers to an included angle of a maximum range that the first radar component 201 can detect in the vertical direction. Optionally, if the quantity of scanning lines of the first radar component 201 is k, the vertical field of view $\theta$ of the first radar component 201 is:

$\theta=(k-1)\varepsilon_1+\delta$, where $\varepsilon_1$ is the vertical angular resolution of the first radar component 201, and $\delta$ is the divergence angle of the laser beam. For example, if the quantity of scanning lines of the first radar component 201 is 4, the vertical field of view of the first radar component 201 is $\theta=3\varepsilon_1+\delta$.

The horizontal angular resolution $\varepsilon_2$ refers to an angle corresponding to a minimum distance that can be resolved by the first radar component 201 in the horizontal direction. In an example in which the multi-line laser radar 20 is applied to the field of the intelligent transportation technologies, a minimum distance between two adjacent vehicles is not less than 100 meters, and a body width of a small car ranges from 1.5 meters to 2 meters. To detect a small car 100 meters away, the horizontal angular resolution of the first radar component 201 is $\varepsilon_2=\tan^{-1}(1.5/100)=0.86°$. Therefore, to meet a detection requirement in the field of the intelligent transportation technologies, the horizontal angular resolution $\varepsilon_2$ of the first radar component 201 should be less than 0.86°. The horizontal angular resolution $\varepsilon_2$ of the first radar component 201 should meet the following formula:

$$\varepsilon_2 = \frac{360}{N/K},$$

where

N is a frequency at which a single laser 21 emits a laser beam, and K is a rotation frequency of the scanning rotating mirror 23. In other words, the horizontal angular resolution $\varepsilon_2$ of the first radar component 201 is determined according to both a frequency at which a single laser 21 emits a laser beam and the rotation frequency of the scanning rotating mirror 23. The frequency at which the single laser 21 emits a laser beam and the rotation frequency of the scanning rotating mirror 23 may be properly set, to enable the horizontal angular resolution $\varepsilon_2$ of the first radar component 201 to be less than 0.86°. For example, if N is 20 KHz, and K is 20 Hz, the horizontal angular resolution $\varepsilon_2$ of the first radar component 201 is 0.36°, and can meet the detection requirement in the field of the intelligent transportation technologies.

In this embodiment, when the multi-line laser radar 20 is in a working state, the rotation axis always rotates based on the preset rotation period. The laser beams emitted by the n lasers 21 pass through the n optical fibers 25 and are exported to the optical collimating unit 22. The n laser beams collimated by the optical collimating unit 22 are incident on a reflector directly facing the optical collimating unit 22 in the scanning rotating mirror 23, and the reflector reflects the collimated n laser beams to the detection area. Because the rotation axis of the scanning rotating mirror 23 always rotates, a reflector on which the collimated n laser beams are incident and a position on which the collimated n laser beams are incident on the reflector change in real time, and irradiated positions of the n laser beams reflected by the reflector in the detection area change cyclically, so as to achieve an effect of laser scanning. If at least two reflectors in the m reflectors have different reflection angles for a same laser beam, the first radar component 201 can implement at least 2n-line scanning. If different reflectors in the m reflectors have different reflection angles for a same laser beam, the first radar component 201 can implement (m×n)-line scanning. It should be additionally noted that, when the multi-line laser radar 20 includes a plurality of radar components, the plurality of radar components may share a same optical collimating unit, or each radar component may have an independent optical collimating unit. Similarly, the plurality of radar components may share a same scanning rotating mirror, or each radar component may have an independent scanning rotating mirror.

In conclusion, according to the technical solutions in this embodiment of this application, the multi-line laser radar includes the first radar component that uses a "multiple transmit and single receive" structure, where only one detector is disposed in the first radar component, and a quantity of detectors is reduced as much as possible on a premise of implementing multi-line scanning, so as to reduce a signal crosstalk between detectors. Therefore, working performance of the multi-line laser radar can be improved, and hardware costs of the multi-line laser radar can be reduced. In addition, the scanning rotating mirror includes at least two reflectors that have different reflection angles for a same laser beam, so that one laser can implement at least two-line scanning, and a quantity of scanning lines of the multi-line laser radar can be increased without increasing a quantity of lasers.

The following embodiment describes a four-line laser radar. The four-line laser radar may be applied to the field of intelligent transportation technologies. For example, the four-line laser radar may be installed on a bumper at a head of a vehicle, so as to implement detection and scanning of an obstacle in front of the vehicle.

Figure 3:
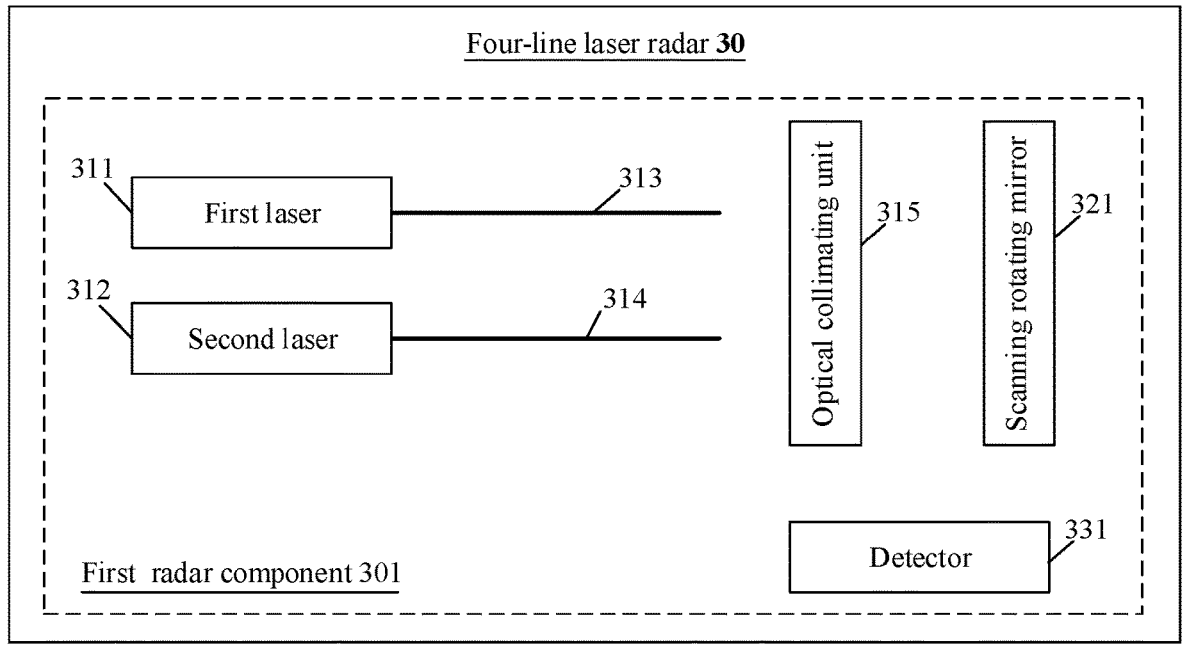
FIG. 3 is a schematic diagram of a four-line laser radar according to an example embodiment of this application.

With reference to FIG. 3, the four-line laser radar 30 includes a first radar component 301, where the first radar component 301 includes two lasers (which are respectively a first laser 311 and a second laser 312), two optical fibers (which are respectively a first optical fiber 313 and a second optical fiber 314), an optical collimating unit 315, a scanning rotating mirror 321, and a detector 331. The lasers, the optical fibers, and the optical collimating unit 315 form a logical laser emitting unit of the first radar component 301. The scanning rotating mirror 321 is a logical beam scanning unit of the first radar component 301. The detector 331 is a logical echo detection unit of the first radar component 301.

An emitting end of the first laser 311 is connected to a light inlet of the first optical fiber 313, and an emitting end of the second laser 312 is connected to a light inlet of the second optical fiber 314. Both the first laser 311 and the second laser 312 are configured to emit a laser beam to the optical collimating unit 315. The first laser 311 and the second laser 312 work in a time-division mode.

The laser beam emitted by the first laser 311 is exported to the optical collimating unit 315 through the first optical fiber 313, and the laser beam emitted by the second laser 312 is exported to the optical collimating unit 315 through the second optical fiber 314. Light outlets of the first optical fiber 313 and the second optical fiber 314 both directly face the optical collimating unit 315. Light outlet points of the first optical fiber 313 and the second optical fiber 314 are both located on a focal plane of the optical collimating unit 315, and a fiber core spacing d between the first optical fiber 313 and the second optical fiber 314 is:

$$d = f \times \tan(\varepsilon_1), \text{ where}$$

f is a focal length of the optical collimating unit 315, and $\varepsilon_1$ is a vertical angular resolution of the first radar component 301.

The optical collimating unit 315 is configured to collimate the laser beam emitted by the first laser 311 and the laser beam emitted by the second laser 312, and the collimated laser beams are incident on the scanning rotating mirror 321.

The scanning rotating mirror 321 includes a rotation axis 3213, and a first reflector 3211 and a second reflector 3212 that rotate around the rotation axis 3213, where an included angle between a normal line of a plane on which the first reflector 3211 is located and a straight line on which the rotation axis 3213 is located is 90 degrees, and an included angle between a normal line of a plane on which the second reflector 3212 is located and the straight line on which the rotation axis 3213 is located is (90-$\varepsilon_1$). A rotation plane of the rotation axis 3213 is perpendicular to an arrangement direction of the laser beams, and the arrangement direction of the laser beams is a vertical direction. Both the first reflector 3211 and the second reflector 3212 are configured to reflect a laser beam, and the first reflector 3211 and the second reflector 3212 have different reflection directions for a same laser beam.

Figure 4:
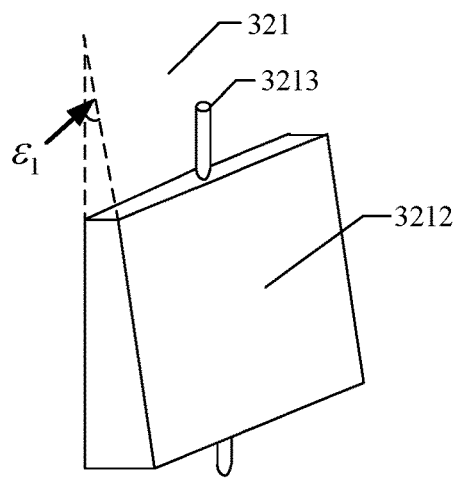
FIG. 4 is a schematic diagram of a scanning rotating mirror of a four-line laser radar according to an example embodiment of this application.

FIG. 4 is a schematic diagram of the scanning rotating mirror 321 according to an example embodiment of this application. An included angle between the first reflector 3211 and the second reflector 3212 is $\varepsilon_1$. An included angle between a normal line of a plane on which the first reflector 3211 is located and a straight line on which the rotation axis 3213 is located is 90°. An included angle between a normal line of a plane on which the second reflector 3212 is located and the straight line on which the rotation axis 3213 is located is (90°-$\varepsilon_1$).

Figure 5:
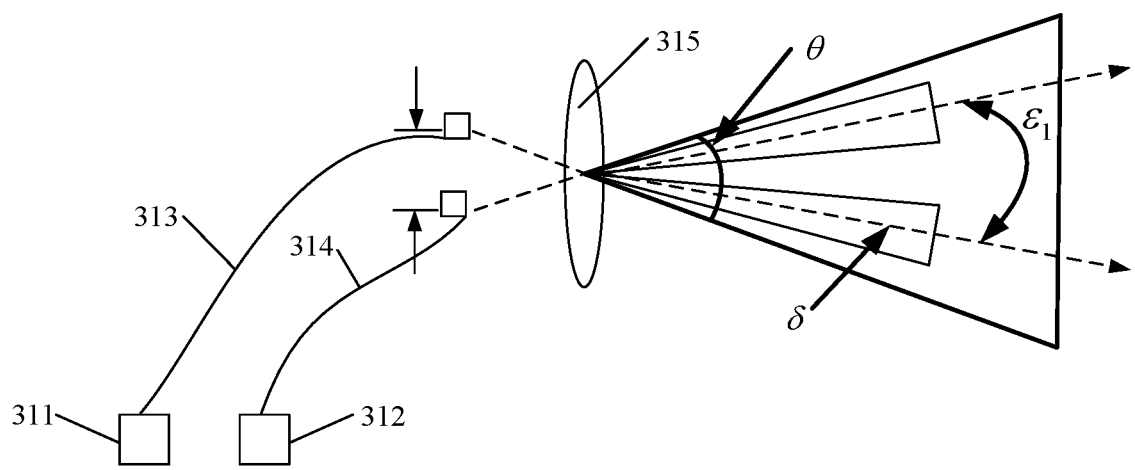
FIG. 5 is a schematic diagram of a receiving field of view of a detector of a four-line laser radar according to an example embodiment of this application.

The detector 331 is configured to receive an echo signal of a laser beam. The detector 331 and the optical collimating unit 315 are located on a same side, and the detector 331 is disposed opposite to the scanning rotating mirror 321. A receiving field of view $\varphi$ of the detector 331 is:

$$\varphi = \sigma(\varepsilon_1 + \delta), \text{ where}$$

σ is a preset tolerance factor. FIG. 5 is a schematic diagram of the receiving field of view φ of the detector 331 of the four-line laser radar 30 according to an example embodiment of this application. A laser beam emitted by the first laser 311 is exported to the optical collimating unit 315 through the first optical fiber 313, and a laser beam emitted by the second laser 312 is exported to the optical collimating unit 315 through the second optical fiber 314. An included angle formed when the two laser beams are emitted after being collimated by the optical collimating unit is $\varepsilon_1$, a divergence angle of the laser beam is δ, and a receiving angle of view φ of the detector 331 should be slightly greater than ($\varepsilon_1$+δ).

Figure 6:
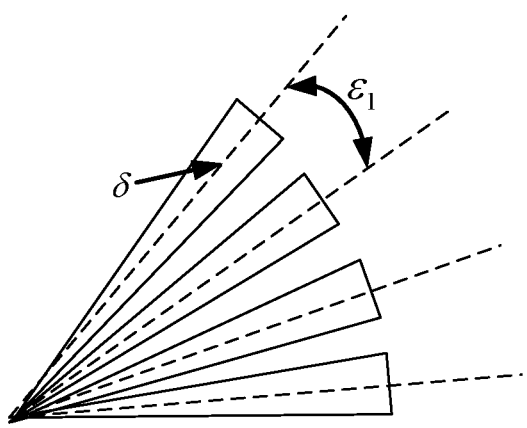
FIG. 6 is a schematic diagram of a vertical field of view of a four-line laser radar according to an example embodiment of this application.

A vertical field of view θ of the first radar component 301 is:

$\theta = 3\varepsilon_1 + \delta$, where $\varepsilon_1$ is a vertical angular resolution of the first radar component 301, and δ is the divergence angle of the laser beam. FIG. 6 is a schematic diagram of the vertical field of view θ of the first radar component 301 according to an example embodiment of this application. An included angle between every two laser beams is $\varepsilon_1$, and a divergence angle of the laser beam is δ. In this case, a vertical field of view of the four-line laser radar 30 is $\theta = 3\varepsilon_1 + \delta$.

Figure 7:
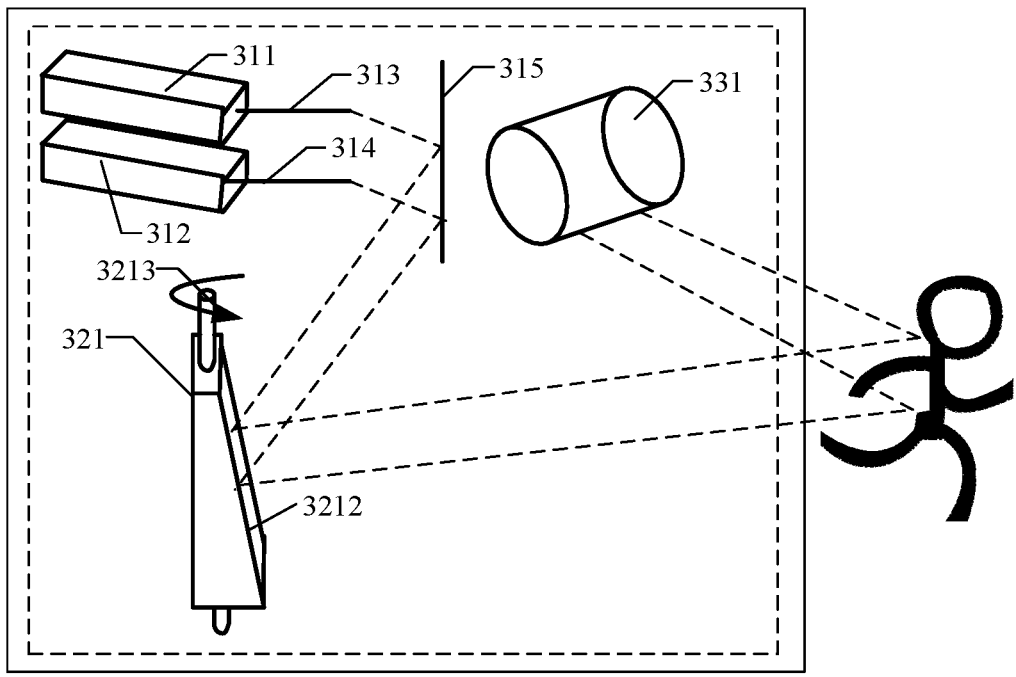
FIG. 7 is an operating principle diagram of a four-line laser radar according to an example embodiment of this application.
Figure 8:
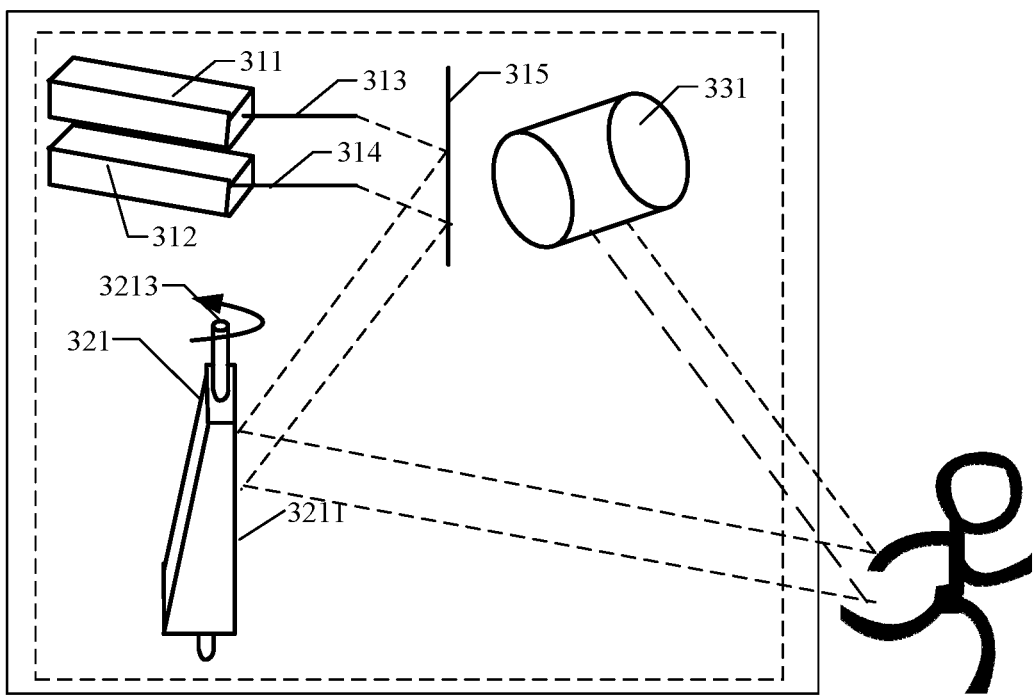
FIG. 8 is an operating principle diagram of a four-line laser radar according to another example embodiment of this application.

The following describes an operating principle of the first radar component 301 with reference to FIG. 7 and FIG. 8. When the first radar component 301 is in a working state, the first reflector 3211 and the second reflector 3212 of the scanning rotating mirror 321 always rotate around the rotation axis 3213 based on a preset rotation period.

FIG. 7 is an operating principle diagram of implementing, by the first radar component 301, two-line scanning in a first half rotation period (that is, 0° to 180°) of the scanning rotating mirror 321 according to an example embodiment of this application. Laser beams emitted by the first laser 311 and the second laser 312 are successively incident on the optical collimating unit 315, and the two laser beams are collimated by the optical collimating unit 315 and then are incident on the second reflector 3212 of the scanning rotating mirror, and the second reflector 3212 reflects the two laser beams to a front of the first radar component 301, so as to implement two-line scanning at an upper layer. If a laser beam reflected by the second reflector 3212 detects, through scanning, an obstacle in front, the detector receives an echo signal of the laser beam.

FIG. 8 is an operating principle diagram of implementing, by the first radar component 301, two-line scanning in a second half rotation period (that is, 180° to 360°) of the scanning rotating mirror 321 according to an example embodiment of this application. In this embodiment, laser beams emitted by the first laser 311 and the second laser 312 are successively incident on the optical collimating unit 315, the two laser beams are collimated by the optical collimating unit 315 and then are incident on the first reflector 3211 of the scanning rotating mirror, and the first reflector 3211 reflects the two laser beams to a front of the first radar component 301, so as to implement two-line scanning at a lower layer. If a laser beam reflected by the first reflector 3211 detects, through scanning, an obstacle in front, the detector receives an echo signal of the laser beam.

It should be understood the term "multi" refers to two or more than two in this specification. The term "and/or" describes an association relationship for describing associated objects, and represents that three relationships may exist. For example, A and/or B may represent the following three cases: Only A exists, both A and B exist, and only B exists. A character "/" usually indicates an "or" relationship between the associated objects. "First", "second" and similar terms used in this specification do not represent any sequence, quantity, or importance, but are only used to distinguish different objects.

The implementations described above further describe the objectives, technical solutions, and beneficial effects of the embodiments of this application in detail. It should be understood that the foregoing descriptions are merely example implementations of the embodiments of this application, but are not used to limit a protection scope of the embodiments of this application. Any modification, equivalent replacement, improvement, or the like made based on the technical solutions of the embodiments of this application shall fall within the protection scope of the embodiments of this application.

What is claimed is:

1. A multi-line laser radar, comprising:
   a first radar component that comprises:
   n lasers,
   an optical collimating unit,
   a scanning rotating mirror, and
   a detector,
   wherein n is an integer greater than 1 and each laser of the n lasers is configured to emit one laser beam to the optical collimating unit;
   wherein the optical collimating unit is configured to collimate n laser beams, and the collimated n laser beams are incident on a target reflector of the scanning rotating mirror, wherein the scanning rotating mirror comprises a rotation axis and m reflectors rotating around the rotation axis, a rotation plane of the rotation axis is perpendicular to an arrangement direction of the collimated n laser beams, the target reflector is a particular reflector of the m reflectors and that is currently rotated to a position opposite to an emergent direction of the collimated n laser beams, and m is an integer greater than 1;
   wherein the target reflector is configured to reflect the received collimated n laser beams, wherein the reflected n laser beams are incident on a detection area of the first radar component, and at least two reflectors existing in the m reflectors have different reflection angles for a same laser beam; and
   wherein the detector is configured to receive echo signals of the reflected n laser beams in the detection area.

2. The multi-line laser radar according to claim 1, wherein an included angle between a normal line of a plane on which an $i^{th}$ reflector of the m reflectors is located and a straight line on which the rotation axis is located is $\alpha+(i-1)\gamma$, wherein $0° < \alpha \leq 90°$, $\gamma = n-1$, $\varepsilon_1$, $\varepsilon_1$ is a vertical angular resolution of the first radar component, and i is a positive integer less than or equal to m.

3. The multi-line laser radar according to claim 1, wherein the first radar component further comprises: n optical fibers, and the n lasers are in a one-to-one correspondence with the n optical fibers; and
   wherein each optical fiber of the n optical fibers is configured to export the laser beam emitted by the laser to the optical collimating unit.

4. The multi-line laser radar according to claim 3, wherein a light outlet point of each optical fiber is located on a focal plane of the optical collimating unit.

5. The multi-line laser radar according to claim 3, wherein a fiber core spacing d between two adjacent optical fibers in the n optical fibers is:

$d=f \times \tan(\varepsilon_1)$, wherein f is a focal length of the optical collimating unit, and $\varepsilon_1$ is a vertical angular resolution of the first radar component.

6. The multi-line laser radar according to claim 1, wherein a receiving field of view φ of the detector is:

$\varphi = \sigma[(n-1)\varepsilon_1 + \delta]$, wherein σ is a preset tolerance factor, $\varepsilon_1$ is a vertical angular resolution of the first radar component, and δ is a divergence angle of the laser beam.

7. The multi-line laser radar according to claim 1, wherein a quantity of scanning lines of the first radar component is K, and a vertical field of view θ of the first radar component is:

$\theta = (k-1)\varepsilon_1 + \delta$, wherein $\varepsilon_1$ is a vertical angular resolution of the first radar component, and δ is a divergence angle of the laser beam.

8. The multi-line laser radar according to claim 1, wherein the n lasers work in a time-division mode.

9. The multi-line laser radar according to claim 1, wherein an arrangement direction of the collimated n laser beams is a vertical direction.

10. A vehicle, including:
a multi-line laser radar including a first radar component configured to implement detection and scanning of obstacles in front of the vehicle, the first radar component comprising:
at least one laser,
an optical collimating unit configured to generate collimated laser beams,
a scanning rotating mirror, wherein the scanning rotating mirror comprises a rotation axis and a plurality of reflectors rotating around the rotation axis, and
a detector configured to receive echo signals in the detection area;
wherein each laser of the at least one laser is configured to emit a corresponding laser beam to the optical collimating unit;
wherein the optical collimating unit generates one or more collimated laser beams, which are directed at a target reflector of the scanning rotating mirror that is currently rotated to a position opposite to an emergent direction of the one or more collimated laser beams from the optical collimating unit;
wherein the target reflector is configured to reflect the one or more collimated laser beams towards the detector, and
wherein at least two reflectors have different reflection angles for a particular laser beam.

11. The vehicle of claim 10, wherein the multi-line laser radar comprises a four-line laser radar.

12. The vehicle of claim 10, wherein an included angle between a normal line of a plane on which an $i^{th}$ reflector is located and a straight line on which the rotation axis is located is $\alpha + (i-1)\gamma$, wherein $0° < \alpha \leq 90°$, $\gamma = (n-1)\varepsilon_1$, $\varepsilon_1$ is a vertical angular resolution of the first radar component, n is a total number of lasers in the at least one laser, and i is a positive integer less than or equal to a number of the plurality of reflectors in the scanning rotating mirror.

13. The vehicle of claim 10, wherein a receiving field of view φ of the detector is:

$\varphi = \sigma[(n-1)\varepsilon_1 + \delta]$, wherein σ is a preset tolerance factor, $\varepsilon_1$ is a vertical angular resolution of the first radar component, n is a total number of lasers in the at least one laser, and δ is a divergence angle of the laser beam.

14. The vehicle of claim 10, wherein the multi-line laser radar further includes a second radar component.

15. The vehicle of claim 14, wherein the second radar component includes a number of lasers and a number of detectors, wherein the number of lasers is equal to the number of detectors.

16. The vehicle of claim 10, wherein each laser of the at least one laser operates in accordance with a time-division mode.

17. A system for detecting obstacles using a multi-line radar, the system comprising:
a first radar component comprising:
at least one laser,
an optical collimating unit configured to generate collimated laser beams,
a scanning rotating mirror, wherein the scanning rotating mirror comprises a rotation axis and a plurality of reflectors rotating around the rotation axis, and
a detector configured to receive echo signals in the detection area;
wherein each laser of the at least one laser is configured to emit a corresponding laser beam to the optical collimating unit;
wherein the optical collimating unit generates one or more collimated laser beams, which are directed at a target reflector of the scanning rotating mirror that is currently rotated to a position opposite to an emergent direction of the one or more collimated laser beams;
wherein a target reflector is configured to reflect the one or more collimated laser beams towards the detector, and
wherein at least two reflectors have different reflection angles for a particular laser beam.

18. The system of claim 17, the system further comprising:
a second radar component that includes a number of lasers and a number of detectors, wherein the number of lasers is equal to the number of detectors.

19. The system of claim 17, wherein the at least two reflectors are configured to implement at least four lines of vertical resolution in the multi-line radar.

20. The system of claim 17, wherein each laser of the at least one laser operates in accordance with a time-division mode.

* * * * *

UNITED STATES PATENT AND TRADEMARK OFFICE
CERTIFICATE OF CORRECTION

PATENT NO. : 11,513,193 B2
APPLICATION NO. : 16/915816
DATED : November 29, 2022
INVENTOR(S) : Fu et al.

It is certified that error appears in the above-identified patent and that said Letters Patent is hereby corrected as shown below:

In the Claims

Claim 2: Column 12, Line 52: "$0°<\alpha \leq 90°$, $y = n - 1$, $\varepsilon_1$, $E_1$ is a vertical angular resolution of" should read -- $0°<\alpha \leq 90°$, $\gamma = ( n-1 ) \varepsilon_1$, $E_1$ is a vertical angular resolution of --.

Signed and Sealed this
Eleventh Day of April, 2023

Katherine Kelly Vidal
*Director of the United States Patent and Trademark Office*